(12) United States Patent
Yu et al.

(10) Patent No.: US 11,102,267 B2
(45) Date of Patent: Aug. 24, 2021

(54) SERVER- AND NETWORK-ASSISTED DYNAMIC ADAPTIVE STREAMING OVER HYPERTEXT TRANSPORT PROTOCOL SIGNALING

(71) Applicant: Apple Inc., Cupertino, CA (US)

(72) Inventors: Yifan Yu, Beijing (CN); Ozgur Oyman, Palo Alto, CA (US); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/480,149

(22) PCT Filed: Apr. 14, 2017

(86) PCT No.: PCT/CN2017/080566
§ 371 (c)(1),
(2) Date: Jul. 23, 2019

(87) PCT Pub. No.: WO2018/188068
PCT Pub. Date: Oct. 18, 2018

(65) Prior Publication Data
US 2019/0379720 A1    Dec. 12, 2019

(30) Foreign Application Priority Data

Apr. 14, 2017  (WO) ................ PCT/CN2017/080566

(51) Int. Cl.
| | | |
|---|---|---|
| *H04L 29/08* | (2006.01) | |
| *H04L 29/06* | (2006.01) | |
| *H04L 12/927* | (2013.01) | |
| *H04L 5/00* | (2006.01) | |

(52) U.S. Cl.
CPC .......... *H04L 65/608* (2013.01); *H04L 63/166* (2013.01); *H04L 65/1069* (2013.01); *H04L 67/02* (2013.01); *H04L 67/42* (2013.01)

(58) Field of Classification Search
CPC ...... H04L 67/42; H04L 69/161; H04L 69/163
USPC ........................................ 370/474
See application file for complete search history.

(56) References Cited

U.S. PATENT DOCUMENTS

| | | | | |
|---|---|---|---|---|
| 2013/0080512 | A1* | 3/2013 | Yasuda | ............... H04L 12/66 709/203 |
| 2013/0275615 | A1* | 10/2013 | Oyman | ............... H04L 67/303 709/231 |
| 2013/0290493 | A1* | 10/2013 | Oyman | ............... H04B 7/0639 709/219 |
| 2014/0044967 | A1* | 2/2014 | Ayers | ............... B07B 13/11 428/402 |
| 2014/0047123 | A1 | 2/2014 | Oyman | |
| 2015/0256582 | A1 | 9/2015 | Bouazizi | |

(Continued)

OTHER PUBLICATIONS

International Patent Office—International Search Report and Written Opinion dated Jan. 12, 2018, from International Application No. PCT/CN2017/080566, 11 pages.

(Continued)

*Primary Examiner* — Asad M Nawaz
*Assistant Examiner* — Jason A Harley
(74) *Attorney, Agent, or Firm* — Fish & Richardson P.C.

(57) ABSTRACT

Embodiments of the present disclosure describe methods and apparatuses for server- and network-assisted dynamic adaptive streaming over hypertext transport protocol signaling.

21 Claims, 7 Drawing Sheets

(56) References Cited

U.S. PATENT DOCUMENTS

| | | | | |
|---|---|---|---|---|
| 2016/0006817 | A1* | 1/2016 | Mitic | H04L 65/80 709/232 |
| 2016/0191672 | A1* | 6/2016 | Perlman | H04L 12/4633 370/474 |
| 2016/0255047 | A1* | 9/2016 | Parthasarathy | H04L 61/3025 709/245 |
| 2017/0070361 | A1* | 3/2017 | Sundermeyer | H04L 12/2809 |
| 2017/0078348 | A1* | 3/2017 | McGinnity | H04N 21/23418 |
| 2017/0134466 | A1* | 5/2017 | Giladi | H04L 65/1089 |
| 2017/0223054 | A1* | 8/2017 | Wing | H04L 63/166 |
| 2018/0063740 | A1* | 3/2018 | McCormick | H04W 76/15 |
| 2018/0139254 | A1* | 5/2018 | Oyman | H04L 65/605 |
| 2018/0367592 | A1* | 12/2018 | Thomas | H04L 65/601 |
| 2019/0141361 | A1* | 5/2019 | Deshpande | H04N 21/4345 |

OTHER PUBLICATIONS

3GPP, "Technical Specification Group Services and System Aspects; Study on Server and Network-assisted DASH (SAND) for 3GPP Multimedia Services (Release 14)," 3GPP TR 26.957 V1.10.0 (Oct. 9, 2016), Lte Advanced Pro, 44 pages.

INTEL, "FS_SAND: TR 26.957 v1.1.0," 3GPP TSG-SA4 Meeting #91, S4-161147, Agenda item: 8.10, Oct. 24-28, 2016, Bangalore, India, 1 page.

3GPP, "Technical Specification Group Services and System Aspects; Study on Server and Network-assisted Dynamic Adaptive Streaming over HTTP (DASH) (SAND) for 3GPP multimedia services (Release 14)," 3GPP TR 26.957 V14.1.0 (Mar. 2017), Lte Advanced Pro, 52 pages.

Swaminathan et al., "Committee Draft for 23009-6: DASH with Server Push and WebSockets," International Organization for Standardization Organisation Internationale De Normalisation ISO/IEC JTC1/SC29/WG11 Coding of Moving Pictures and Associated Audio, ISO/IEC JTC1/SC29/WG11/N15993, Feb. 2016, San Diego, US, 43 pages.

ISO/IEC, "Information technology—Dynamic adaptive streaming over HTTP (DASH)—Part 5: Server and network assisted DASH (SAND)," International Standard, ISO/IEC 23009-5, First edition Feb. 2017, Reference No. ISO/IEC 23009-5:2017(E), 54 pages.

Li et al., "A Mobile Edge Computing-based architecture for improved adaptive HTTP video delivery," 2016 IEEE Conference on Standards for Communications and Networking (CSCN), Oct. 31-Nov. 2, 2016, Berlin, Germany, 6 pages.

3GPP, "3rd Generation Partnership Project; Technical Specification Group Services and System Aspects; Study on Server and Network-assisted Dynamic Adaptive Streaming over HTTP (DASH) (SAND) for 3GPP multimedia services (Release 14)," 3GPP 26.957 V 14.1.0, Mar. 17, 2017, 52 pages.

Dierks Independent et al., "The Transport Layer Security (T LS) Protocol Version 1.2," Internet Engineering Task Force, IETF Standard, Geneva, Switzerland, Aug. 1, 2008, 104 pages.

EP Extended European Search Report and Written Opinion in European Appln No. 17905181.8, dated Nov. 5, 2020, 7 pages.

* cited by examiner

SERVER- AND NETWORK-ASSISTED DYNAMIC ADAPTIVE STREAMING OVER HYPERTEXT TRANSPORT PROTOCOL SIGNALING

CROSS REFERENCE TO RELATED APPLICATIONS

This application is a national phase entry under 35 U.S.C. § 371 of International Application No. PCT/CN2017/080566, filed Apr. 17, 2017, entitled "SERVER-AND NETWORK-ASSISTED DYNAMIC ADAPTIVE STREAMING OVER HYPERTEXT TRANSPORT PROTOCOL SIGNALING," the disclosure of which is incorporated herein by reference.

FIELD

Embodiments of the present disclosure generally relate to the field of networks, and more particularly, to apparatuses, systems, and methods for server- and network-assisted dynamic adaptive streaming over hypertext transport protocol signaling.

BACKGROUND

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Dynamic adaptive streaming over hypertext transfer protocol ("DASH") aims at optimizing viewing experience by matching a quality of video with current network conditions and device capabilities. Streaming enhancements in a Third Generation Partnership Project ("3GPP") environment contemplate improvement of adaptation on a client-side based on network/server-side information such as cached segments, alternative segment availability, and network throughput/quality of service. 3GPP functional entities termed as packet-switch streaming service ("PSS") servers and PSS clients, are introduced on a network side and a user equipment ("UE") side, respectively, for DASH improvement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
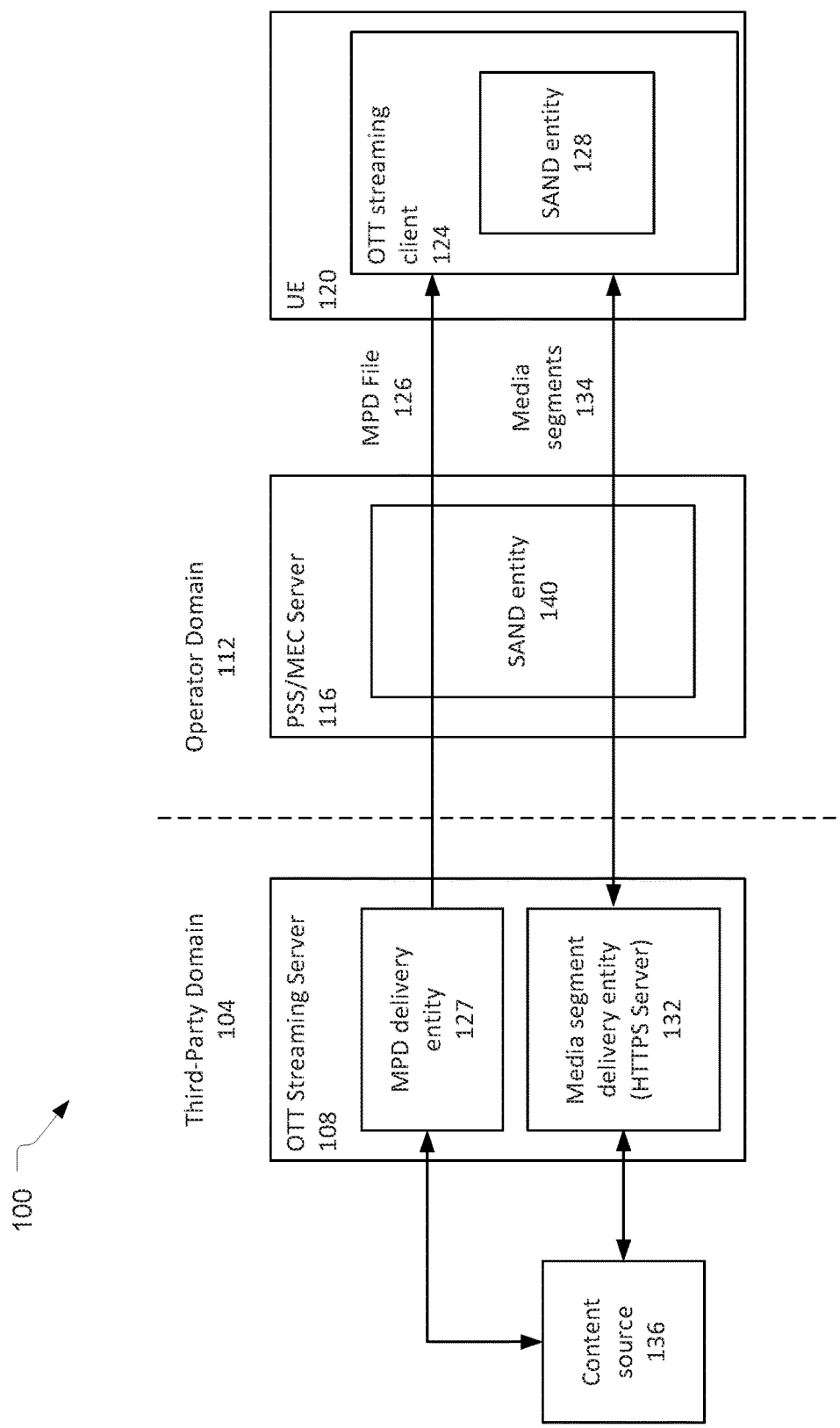
FIG. 1 illustrates a system in accordance with some embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In server- and network-assisted DASH ("SAND"), network/server information may be provided to a UE using a message exchange between SAND entities operating in a PSS server and the UE. The UE may fetch appropriate DASH segments from an over-the-top ("OTT") streaming server following a notification from the PSS server.

DASH may rely on a media presentation description ("MPD") file to provide information on the structure and versions of the DASH segments stored in a hypertext transfer protocol ("HTTP") server. The information in the MPD file may include, for example, different bitrates, frame rates, resolutions, codec types, etc. A streaming client in the UE may use the information in the MPD file to determine the relation of the DASH segments and how they form a media presentation. The streaming client may then request DASH segments using, for example, HTTP GET or partial GET methods.

In some instances, a PSS server may enable SAND by modification of the MPD file. The PSS server may intercept the MPD file from the OTT streaming server. The PSS server may then modify the MPD file by referring to the message reported by the SAND entity of the UE and deliver the MPD file to the UE.

Mobile edge computing ("MEC") based architectures introduce an adaptation algorithm running as a MEC service to relax network congestion while improving user experience. In these architectures, a MEC server may be used to modify an original MPD file associated with the requested DASH stream so that the UE could retrieve the customized MPD file for appropriate segment selection. The MEC server may periodically query an access node for the latest radio information update so the MPD file is modified to match the radio status.

In the existing SAND architecture of 3GPP, the UE does not obtain information to locate the PSS server in a 3GPP network. Additionally, a UE must be updated to integrate a SAND entity, which may require further modification in an OTT streaming client to support the handling of SAND messages and conduct additional synthesis between the SAND message exchange and an ongoing streaming session. Such update may cause a frame-level modification in the UE and the OTT streaming client.

In both architectures, the MEC/PSS servers may have to modify the MPD file, which is generally transmitted as a source payload from an OTT streaming server. This may lead to two challenges. First, the MEC-based architecture may fail to enable the MPD file customization following the radio status given that the DASH streaming is delivered with hypertext transfer protocol over transport layer security ("HTTPS") because the encrypted payload is inaccessible to the MEC server. The second challenge is that an OTT streaming client may not have full control of adaption in video streaming in the presence of MPD modification by the MEC server. Since the streaming client must rely on an MPD file to conduct the streaming adaptation, the actual adaptation of video streaming may depend on the customization of the MPD file by the MEC server, in addition to the action from the streaming client.

Embodiments of the present disclosure may address various challenges associated with implementing SAND. For example, disclosed embodiments enable an HTTPS-based, network-assisted DASH in which SAND messages are delivered in conjunction with a secured transmission control protocol ("TCP") connection that carries a corresponding stream. An OTT streaming client can conduct video adaptation based on network assistance without awareness of a location of the PSS server. It may just need a minor update on a transport layer security ("TLS") software package in, for example, the OTT streaming client. Frame-level modification on the UE may be avoided. These and other embodiments are described in further detail below.

FIG. 1 illustrates a system 100 in accordance with some embodiments. The system 100 may include a third-party domain 104 having an OTT streaming server 108 that is used to provide streaming content such as audio, video, or other media to end users. The system 100 may further include an operator domain 112 having a PSS/MEC server 116 and a UE 120. In various embodiments, the operator domain 112 may be a domain of a mobile network operator and may be, for example, a 3GPP Long Term Evolution ("LTE") domain, an LTE-advanced ("LTE-A") domain, or a Fifth Generation (5G) domain.

Briefly, the UE 120 may include an OTT streaming client 124 that communicates with an OTT streaming server 108 to receive streaming content over an HTTPS session. The OTT streaming client 124 may also be referred to as a DASH client. In particular, the OTT streaming client 124 may receive an MPD file 126 from an MPD delivery entity 127 of the OTT streaming server 108. The OTT streaming client 124 may use the MPD file 126 to request desired media segments from a media segment delivery entity 132, which may also be referred to as a 3GP segment delivery entity or an HTTPS server. In various embodiments, the DASH segments may also be referred to as 3GP-DASH segments, media segments, etc. The HTTPS server 132 may then deliver the requested media segments 134 to the OTT streaming client 124.

In some embodiments, the media content, for example, the media segments 134, may be prepared external to the OTT streaming server 108 by a content source 136 coupled with both the HTTPS server 132 and the MPD delivery entity 127. The MPD delivery entity 127 may generate or otherwise adapt the MPD file 126 based on the media content in the content source 136 prior to delivery to the OTT streaming client 124.

In various embodiments, the entities of the PSS/MEC server 116, the OTT streaming server 108, or the content source 136 may be referred to as DASH-aware network elements ("DANEs"). DANEs may have at least minimum intelligence about DASH, for example, they may be aware that delivered objects are DASH-formatted objects such as the MPD or the DASH segments and may prioritize, parse, or modify such objects.

The PSS/MEC server 116 in the operator domain 112 may include a SAND entity 140 that is to transmit/receive SAND messages to/from the SAND entity 140 of the OTT streaming client 124. In some embodiments, the SAND messages may be delivered over a transport layer security ("TLS") connection used for the delivery of the MPD file 126 and media segments 134.

The SAND messages may include messages that are used to improve efficiency of streaming sessions by configuring, requesting, or providing information about real-time operational characteristics of networks, servers, proxies, caches, content delivery networks ("CDNs"), clients, etc. In some embodiments, the SAND messages may include parameters enhancing reception ("PER") messages transmitted from SAND entity 140 to SAND entity 128 to inform clients about cached segments, alternative segment availability, timing information for delivery, and network throughput/quality of service ("QoS"), etc, which may lead to intelligent DASH client adaptation behavior; status messages transmitted from SAND entity 128 to SAND entity 140; or metrics messages transmitted from SAND entity 128 to SAND entity 140. The metrics and status messages may include, for example, quality of experience ("QoE") metrics from DASH, including average throughput, buffer level, initial play out the way, HTTP request/response transactions, representation switch events, and play list, which may be beneficial for detecting and debugging failures, managing streaming performance, and allowing for QoE aware network adaptation and service provisioning; shared resource allocation message; anticipated requests message; accepted alternative message; absolute deadline message; maximum round trip time message; next alternatives message; and client capabilities message. The PER messages may include, for example, a resource status message; DANE resource status message; shared resource assignment message; MPD validity end time message; throughput message; availability time offset message; quality of service ("QoS") information message; delivered alternatives message; and DANE capabilities message. These messages are described in further detail below with respect to Table 1.

In contrast to traditional SAND architectures, in which SAND entities exchange SAND messages through a dedicated control channel, the SAND entities 140 and 128 may insert SAND messages into TLS handshaking messages exchanged by the OTT streaming server 108 and the OTT streaming client 124.

In some embodiments, new extensions are introduced into the TLS handshaking messages to allow an exchange of SAND messages associated with a specific HTTPS session. The exchange of SAND messages may be between the SAND entity 140 of the PSS/MEC server 116 and the SAND entity 128 of the OTT streaming client 124. In some embodiments, the SAND entity 140 may build the SAND message destined to the SAND entity 128 in a ServerHello message, while the SAND entity 128 may build the SAND message destined to the SAND entity 140 in a ClientHello message. The ClientHello and ServerHello messages may be used to establish security enhancement capabilities between a client and a server. The ClientHello and ServerHello messages may establish: protocol version, session ID, cipher suite, and compression method. In some embodiments, to enable the SAND messages to be exchanged without an awareness of the network functional entity's location in the UE 120, the PSS/MEC server 116 may run as an in-path TCP proxy that is transparent to the UE 120. In this manner, the PSS/MEC server 116 may transparently insert itself into the TLS handshaking exchange for the purpose of exchanging SAND messages.

Figure 2:
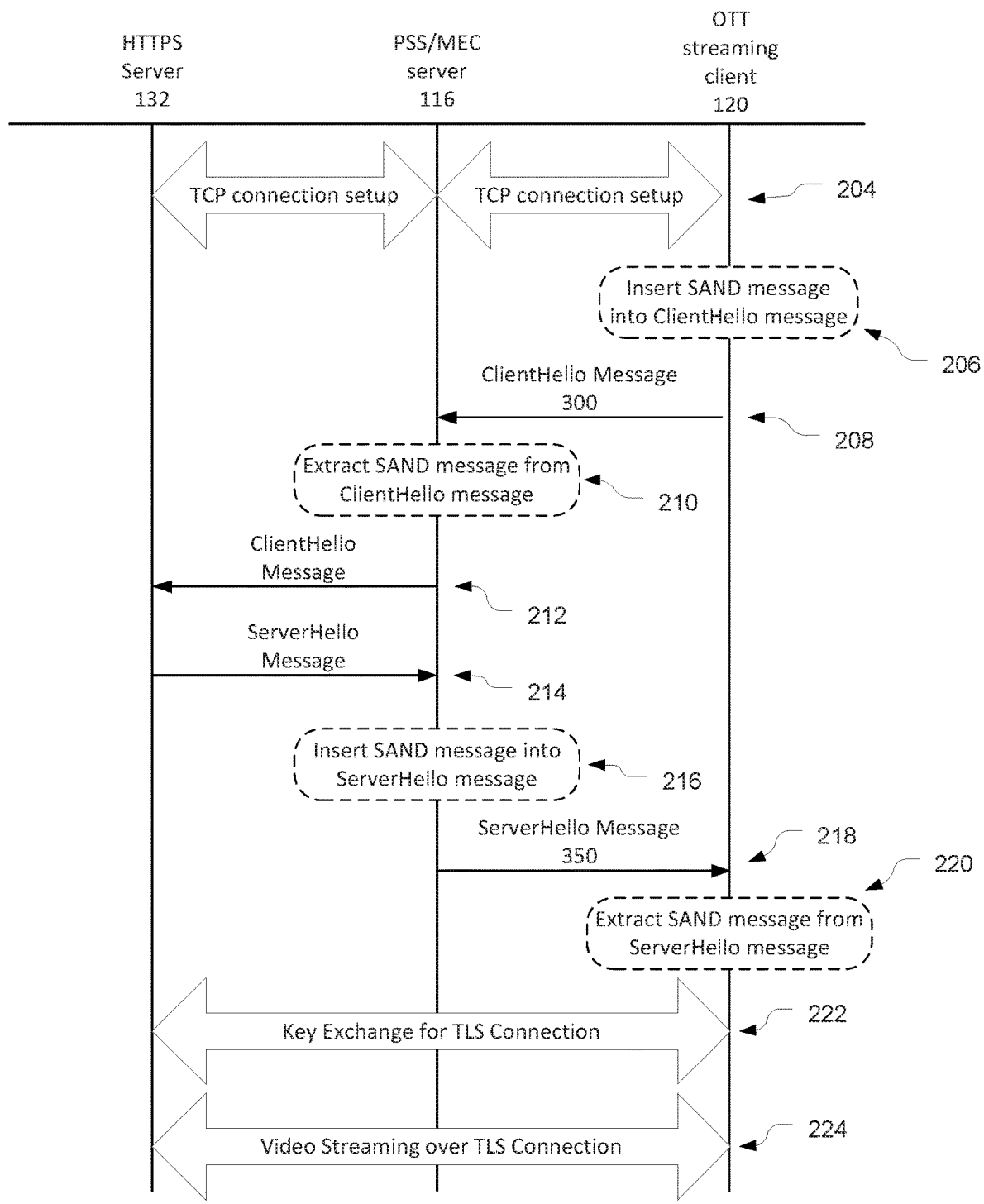
FIG. 2 illustrates a message exchange between components of a system in accordance with some embodiments.

A message exchange between the components illustrated in FIG. 1 is shown in FIG. 2 in accordance with some embodiments.

At 204, the PSS/MEC server 116 may set up a first leg of a TCP connection with the OTT streaming client 124 of the UE 120, and the PSS/MEC server 116 may set up a second leg of the TCP connection with the HTTPS server 132. To create the first and second legs of the TCP connection, the PSS/MEC server 116 may act as an in-path TCP proxy and intercept a TCP handshaking message from the OTT streaming client 124 and may generate and transmit another TCP handshaking message to the HTTPS server 132. The OTT streaming client 124 may be unaware of the interception of the TCP handshaking message by the PSS/MEC server 116. Rather, from the perspective of the OTT streaming client 124, the TCP connection may appear as one direct connection with the HTTPS server 132.

After the TCP connection is created at 204, the SAND entity 128 may, at 206, insert a SAND message into a ClientHello message 300 that is generated by the OTT streaming client 124 to establish a secured data path with the HTTPS server 132. The OTT streaming client 124 may then transmit the ClientHello message 300 at 208. In this manner, the UE 120 may initiate the SAND message exchange without being aware of a location of the PSS/MEC server 116.

Figure 3A:
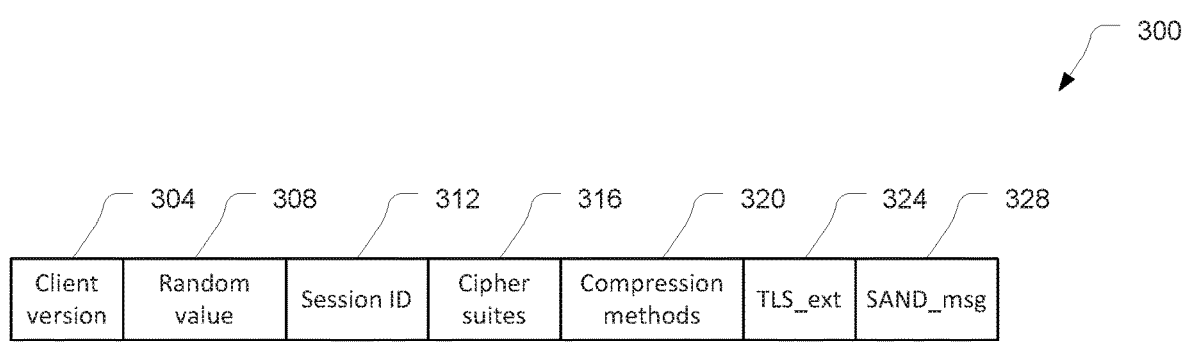
FIGS. 3(a) and 3(b) respectively illustrate a ClientHello message and a ServerHello message in accordance with some embodiments.
Figure 3B:
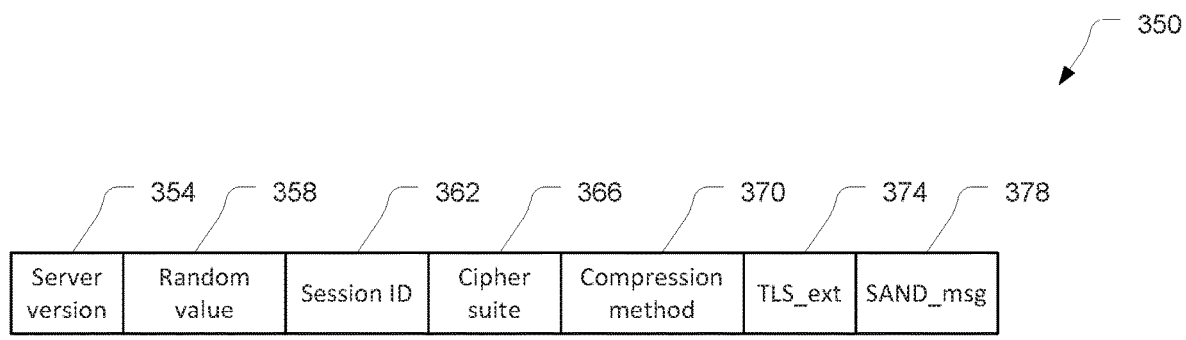

FIG. 3(*a*) illustrates the ClientHello message 300 in accordance with some embodiments. The ClientHello message 300 may include a client version field 304 that includes a value to provide a secure sockets layer ("SSL")/TLS protocol version suggested by the OTT streaming client 124; a random value field 308 having a client-generated random structure, which may be based on a timestamp from the OTT streaming client 124; a session ID field 312 to include a value to identify a session to use (for example, the OTT streaming client 124 may decide to reuse a previously established session); a cipher suites field 316 to include one or more values to identify a list of SSL ciphers supported by the OTT streaming client 124; a compression method field 320 to include one or more values to identify a list of compression methods supported by the OTT streaming client 124; a TLS extension field 324 to include one or more values to identify, in this embodiment, a SAND message originating from the SAND entity 128; and a SAND message field 328 to include information to be conveyed by the SAND message.

The SAND entity 140 of the PSS/MEC server 116 may check the ClientHello message 300 in an attempt to detect a SAND message. If a SAND message is detected, the SAND entity 140 may extract the SAND message from the ClientHello message 300 at 210. In some embodiments, extraction of the SAND message may result in a modification of the ClientHello message 300 to exclude the SAND message (for example, remove TLS extension field 324 and SAND message field 328. In other embodiments, extraction of the SAND message may not result in a modification of the ClientHello message 300. In these embodiments, the SAND entity 140 may simply access the SAND message in order to extract the information of the SAND message while leaving the SAND message in the ClientHello message 300 that is subsequently forwarded to the HTTPS server 132 at 212. At 214, the HTTPS server 132 may respond to the received ClientHello message 300 by sending a ServerHello message. The ServerHello message may not include a SAND message.

The SAND entity 140 of the PSS/MEC server 116 may, at 216, insert a SAND message into the ServerHello message to provide ServerHello message 350. The SAND message inserted into the ServerHello message may include information responsive to the SAND message extracted from the ClientHello message, or it may include unrelated information transmitted at the initiative of the SAND entity 140.

FIG. 3(*b*) illustrates the ServerHello message 350 in accordance with some embodiments. The ServerHello message 350 may include a server version field 354 that includes a value to provide the lower of the SSL/TLS protocol version suggested by the OTT streaming client 124 in the ClientHello message 300 and the highest SLL/TLS protocol version supported by the HTTPS server 132; a random value field 358 having a server-generated random structure, which may be based on a timestamp from the HTTPS server 132; a session ID field 362 to include a value to identify a session corresponding to the connection, which may correspond to the session ID of the ClientHello message 300 if present and a match is found by the HTTPS server 132; a cipher suite field 366 to include a value to identify a single cipher suite selected by the HTTPS server 132 from the list of cipher suites provided in the cipher suites field 316; a compression method field 370 to include a value to identify a single compression algorithm selected by the HTTPS server 132 from the list of compression methods in compression methods field 320; TLS extension 374 to include a value to identify, in this embodiment, a SAND message originating from the SAND entity 140; and a SAND message field 378 to include the information to be conveyed by the SAND message.

At 218, the PSS/MEC server 116 may forward the ServerHello message 350, which includes the SAND message, to the UE 120. The SAND entity 128 may, at 220, extract the SAND message from the ServerHello message 350.

At 222, the OTT streaming client 124 and the HTTPS server 132 may perform a key exchange for the TLS connection to complete setup of a secured TLS connection. The OTT streaming client 124 may then conduct video streaming over the secured TLS connection at 224.

The video streaming 224 may be based on the information exchanged in the SAND messages. For example, the PSS/MEC server 116 may modify an MPD file based on the SAND message extracted from the ClientHello message at 210 and deliver the modified MPD file to the OTT streaming client 124. For another example, the SAND entity 128 may request DASH segments based on the SAND message extracted from the ServerHello message at 220.

While FIG. 2 describes the SAND messages being exchanged in ClientHello and ServerHello messages that are exchanged at the initial setup of a TCP connection, other embodiments may exchange SAND messages in other messages or in the same messages at other times. For example, in some embodiments, the DANE may send a SAND message in a HelloRequest message; or the DASH client may send a SAND message in a ClientHello message that is transmitted at the initiative of the OTT streaming client 124 in order to, for example, renegotiate security parameters of an existing connection.

Table 1 below shows TLS extension types that may be associated with various SAND message descriptions in accordance with some embodiments.

TABLE 1

TLS Extension for SAND Messages

| TLS Extension Type | SAND Message Description |
|---|---|
| 38 | Reserved |
| 39 | TCPConnections |
| 40 | HTTPRequestResponseTransactions |
| 41 | RepresentationSwitchEvents |
| 42 | BufferLevel |
| 43 | Playlist |
| 44 | AnticipatedRequests |
| 45 | SharedResourceAllocation |
| 46 | AcceptedAlternatives |
| 47 | AbsoluteDeadline |
| 48 | MaxRTT |
| 49 | NextAlternatives |
| 50 | ClientCapabilities |
| 51 | ResourceStatus |
| 52 | DANEResourceStatus |
| 53 | SharedResourceAssignment |
| 54 | MPDValidityEndTime |
| 55 | Throughput |
| 56 | AvailabilityTimeOffset |
| 57 | QoSInformation |
| 58 | DeliveredAlternative |
| 59 | DANECapabilities |
| 60 | UEAA ID |
| 61 | ServiceID |
| 62 . . . 185 | Reserved for future ISO use |
| 186 . . . 293 | Reserved for private use |

The SAND messages, briefly described below, may be consistent with descriptions of corresponding SAND messages in 3GPP TR 26.957 v14.1.0 (2017-03) and ISO/IEC23009-5:2017. The DANE referred to in the description below may correspond to the SAND entity 140; and the DASH client referred to in the description below may correspond to SAND entity 128 (or OTT streaming client 124, more generally).

TLS extension type 39 may correspond to a TCP connections SAND message. A DASH client may send this message to a DANE to provide the DANE with information at a TCP level about HTTP request/response transactions.

TLS extension type 40 may correspond to an HTTP request/response transactions SAND message. A DASH client may send this message to a DANE to provide information about HTTP request/response transactions.

TLS extension type 41 may correspond to a representation switch events SAND message. A DASH client may send this message to a DANE to provide information describing representation switch events. A representation switch event corresponds to a switch from a first media content representation to a second media content representation. Each representation switch event may include attributes to indicate the switched-to representation, a real time of the switch event (for example, wall-clock time), a media time of the earliest media sample (out of all media components) played out from the switched-to representation, a level identifying a sub-representation (for example, a level of the switched-to representation), and an access method by which the switched-to representation or sub-representation is received. In some embodiments, the access method may be unicast (for example, HTTP) or multicast/broadcast (for example, multimedia broadcast multicast service ("MBMS")).

TLS extension type 42 may correspond to a buffer level SAND message, which may allow a DASH client to provide information to a DANE about a buffer level at the DASH client at a given point in time.

TLS extension type 43 may correspond to a playlist SAND message, which may allow a DASH client to provide information to a DANE about playback periods. For example, in some embodiments a playlist SAND message may provide information regarding various playlist elements such as, for example, the identifiers of the representations that were rendered and their rendering times (in media time) and durations, playback speed relative to normal playback speed (for example, to track trick modes such as fast forward or rewind) and reasons for why continuous playback of a representation was interrupted. TLS extension type 44 may correspond to an anticipated requests SAND message, which may allow a DASH client to announce to a DANE the specific set of segments in which it is interested, for example, the set of segments the DASH client is likely to select and request soon.

TLS extension type 45 may correspond to a shared resource allocation SAND message, which may allow a DASH client to provide information on a set of operating points (such as desired bandwidth and quality) to one or more DANEs with an intent to share network resources.

TLS extension type 46 may correspond to an accepted alternatives SAND message, which may allow a DASH client to inform DANEs on a media delivery path (typically caching DANEs) when they request a given DASH segment that they are willing to accept other DASH segments as alternatives.

TLS extension type 47 may correspond to an absolute deadline SAND message, which may allow a DASH client to indicate to a DANE an absolute deadline in wall clock time by when a requested DASH segment needs to be completely received. This may allow the network to prefetch content to ensure the timely delivery to the OTT streaming client 124. TLS extension type 48 may correspond to a maximum round trip time ("RTT") SAND message, which may allow an DASH client to indicate to a DANE the maximum round trip time of a request from a time when the request was issued until a request needs to be completely available at the DASH client.

TLS extension type 49 may correspond to a next alternatives SAND message, which may allow a DASH client to inform a DANE about which alternatives it is willing to accept for the request of the next segment.

TLS extension type 50 may correspond to a client capabilities SAND message, which may allow a DASH client to share its SAND capabilities, for example, a set of SAND messages it supports, with a DANE.

TLS extension type 51 may correspond to a resource status SAND message, which may allow a DANE to inform a DASH client, typically in advance, about knowledge of segment availability including, for example, caching status of segments in the DANE.

TLS extension type 52 may correspond to a DANE resource status SAND message, which may allow a DANE to signal (currently or anticipated to be) available data structures to a DASH client. The DANE resource status SAND message may additionally/alternatively allow the DANE to signal which data structures are not available.

TLS extension type 53 may correspond to a shared resource assignment SAND message, which may allow the DANE to send, to DASH clients that compete for bandwidth over the same network, information about how much bandwidth they should use in order to fairly share the total bandwidth.

TLS extension type 54 may correspond to an MPD validity end time SAND message, which may allow a DANE to inform a DASH client that an MPD can only be used up to a certain wall-clock time.

TLS extension type 55 may correspond to a throughput SAND message, which may allow a DANE to inform a DASH client of throughput characteristics and guarantees.

TLS extension type 56 may correspond to an availability time offset SAND message, which may be used by the DANE to provide a DASH client knowledge of an availability time offset from the DANE.

TLS extension type 57 may correspond to a QoS information SAND message, which may be used by the DANE to signal to a DASH client available QoS information such as parameters including, but not limited to, guaranteed bit rate, maximum bit rate, delay, and packet loss rate. The DASH client may take this information into consideration when requesting media segments so that the consumed content bandwidth remains within the limits established by the signaled QoS information.

TLS extension type 58 may correspond to delivered alternative SAND message, which may be transmitted in response to an accepted alternative SAND message sent by the DASH client. The DANE may use the delivered alternatives SAND message to provide information about an alternative segment delivered to the DASH client.

TLS extension type 59 may correspond to a DANE capabilities SAND message, which may be used by the DANE to inform the DASH client of the DANE's SAND capabilities, for example, a set of SAND messages supported by the DANE.

TLS extension type 60 may correspond to a UE authentication/authorization ("UEAA") identifier ("ID") SAND message, which may be used to communicate the UEAA ID associated with a specific streaming service in the UE 120.

TLS extension type 61 may correspond to a service ID SAND message, which may be used to provide a unique identifier of a service registered by a mobile network operator ("MNO").

An OTT streaming provider may firstly obtain the unique service ID of its streaming service registered in the operator network. The operator network may provision the security key to the OTT streaming provider to generate the UEAA ID. The UEAA ID may be generated based on the following:

$$UEAA\ ID=\text{Hash}(security\ key,\ UE\ IP address,\ service\ ID).\quad\text{Equation 1}$$

Figure 4:
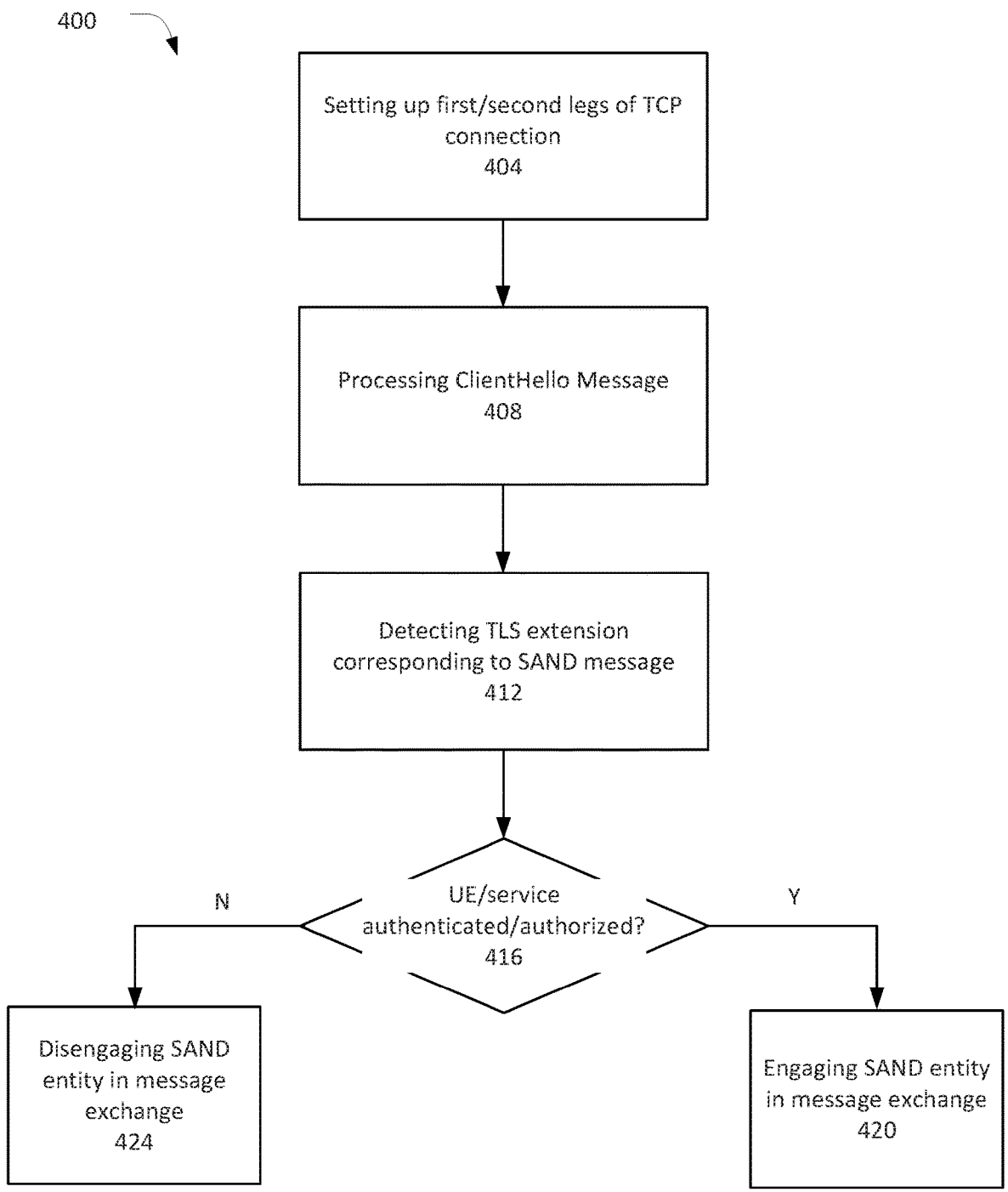
FIG. 4 illustrates an example operation flow/algorithmic structure of a server according to some embodiments.

FIG. 4 illustrates an operation flow/algorithmic structure 400 in accordance with some embodiments. In some embodiments, the operation flow/algorithmic structure 400 may be implemented by SAND entity 140 or, more generally, the PSS/MEC server 116.

The operation flow/algorithmic structure 400 may include, at 404, setting up first/second legs of a TCP connection. The PSS/MEC server 116 may operate as a TCP proxy and receive client-side TCP handshaking messages from an OTT streaming client 124. The PSS/MEC server 116 may transmit network-side TCP handshaking messages, based on the client-side TCP handshaking messages, to the HTTPS server 132.

The PSS/MEC server 116 may receive, from the HTTPS server 132, network-side TCP handshaking messages. The PSS/MEC server 116 may transmit, to the OTT streaming client 124, client-side TCP handshaking messages that are based on the network-side TCP handshaking messages received from the HTTPS server 132.

The first and second legs of the TCP connection may be set up following the exchange of the initial TCP handshaking messages between the OTT streaming client 124, the PSS/MEC server 116, and the HTTPS server 132. The PSS/MEC server 116 may appear, to the OTT streaming client 124, as the OTT streaming server 108. Conversely, the PSS/MEC server 116 may appear, to the OTT streaming server 108, as the OTT streaming client 124.

The operation flow/algorithmic structure 400 may further include, at 408, processing a ClientHello message. In particular, the SAND entity 140 may process the ClientHello message to determine whether it contains a SAND message.

The operation flow/algorithmic structure 400 may include detecting a TLS extension that corresponds to a SAND message at 412. The SAND entity 140 may attempt to detect a known TLS extension that corresponds to a SAND message as described in Table 1, for example.

The operation flow/algorithmic structure 400 may further include, at 416, authenticating/authorizing the UE 120 and OTT streaming service. In some embodiments, the SAND message within the ClientHello message may include both UEAA ID and the service ID, and their corresponding TLS extensions, to allow the network to authenticate/authorize the UE 120 and OTT streaming service.

Upon identifying the appropriate TLS extensions, for example, TLS extensions 60 and 61, the SAND entity 140 may extract the UEAA ID and the service ID from the ClientHello message. The SAND entity 140 may retrieve a security key from a database of a mobile network operator. The SAND entity 140 may then calculate a hash value using the security key, an IP address of the UE 120, and the service ID. The SAND entity 140 may compare the calculated hash value with the UEAA ID.

If the calculated hash value matches the UEAA ID, the SAND entity 140 may authenticate/authorize the UE 120 and the OTT streaming service and the operation flow/algorithmic 400 structure may advance to engaging SAND entity 128 in a SAND message exchange at 420. To engage the SAND entity 128 in the SAND message exchange, the SAND entity 140 may process information received from the SAND entity 128 in a SAND message of a ClientHello message, for example; transmit information to the SAND entity 128 in a SAND message inserted in a ServerHello message, for example; etc.

If the calculated hash value does not match the UEAA ID, the SAND entity 140 may determine the UE 120 or the OTT streaming service is not authenticated/authorized and the operation flow/algorithmic structure 400 may advance to disengaging SAND entity 128 in the SAND message exchange at 424. To disengage the SAND entity 128 in the SAND message exchange, the SAND entity 140 may simply forward packets between the OTT streaming client 124 and the OTT streaming server 108 without processing or transmitting any information in SAND messages.

Figure 5:
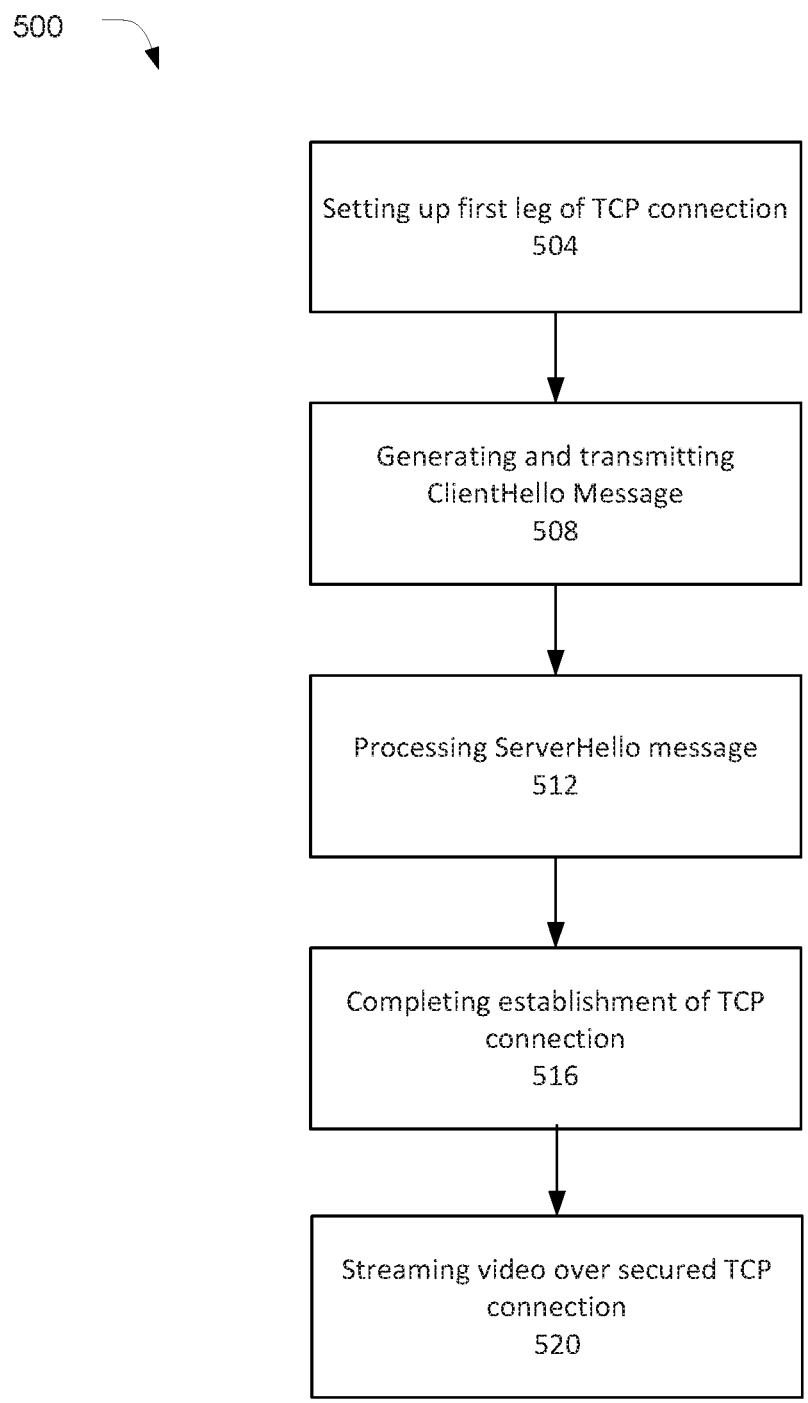
FIG. 5 illustrates an example operation flow/algorithmic structure of a user equipment according to some embodiments.

FIG. 5 illustrates an operation flow/algorithmic structure 500 in accordance with some embodiments. In some embodiments, the operation flow/algorithmic structure 300 may be implemented by SAND entity 128 or, more generally, the OTT streaming client 124.

The operation flow/algorithmic structure 500 may include, at 504, setting up a first leg of a TCP connection. The OTT streaming client 124 may transmit client-side TCP handshaking messages to the OTT streaming server 108. As described above, the PSS/MEC server 116 may intercept the TCP handshaking messages and respond, on behalf of the OTT streaming server 108, with network-side TCP handshaking messages. The operation flow/algorithmic structure 500 may further include, at 508, generating and transmitting a ClientHello message. The SAND entity 128 may generate the ClientHello message to include a SAND message. The SAND message may include, among other information that may be relevant to the SAND, UEAA ID and service ID to enable the network to perform the authentication/authorization described above with respect to operation flow/algorithmic structure 400.

Assuming successful authentication/authorization, the operation flow/algorithmic structure 500 may further include processing a ServerHello message at 512. The processing of the ServerHello message may include extracting a SAND message from the ServerHello message.

The operation flow/algorithmic structure 500 may further include, at 516, completing establishment of the TCP connection. To establish a secured TCP connection, the OTT streaming client 124 may perform a hash calculation using parameters transmitted in the ServerHello message. In some embodiments, to enable the establishment of a secured TCP connection, the SAND message of the ServerHello message should be excluded from the hash calculation used to establish the secured TCP connection.

The operation flow/algorithmic structure 500 may further include, at 520, streaming video over the secured TCP connection. In some embodiments, the streaming of the video may include requesting media segments based on information obtained from various SAND messages (for example, PER messages); transmitting status/metrics messages in SAND messages; etc.

Figure 6:
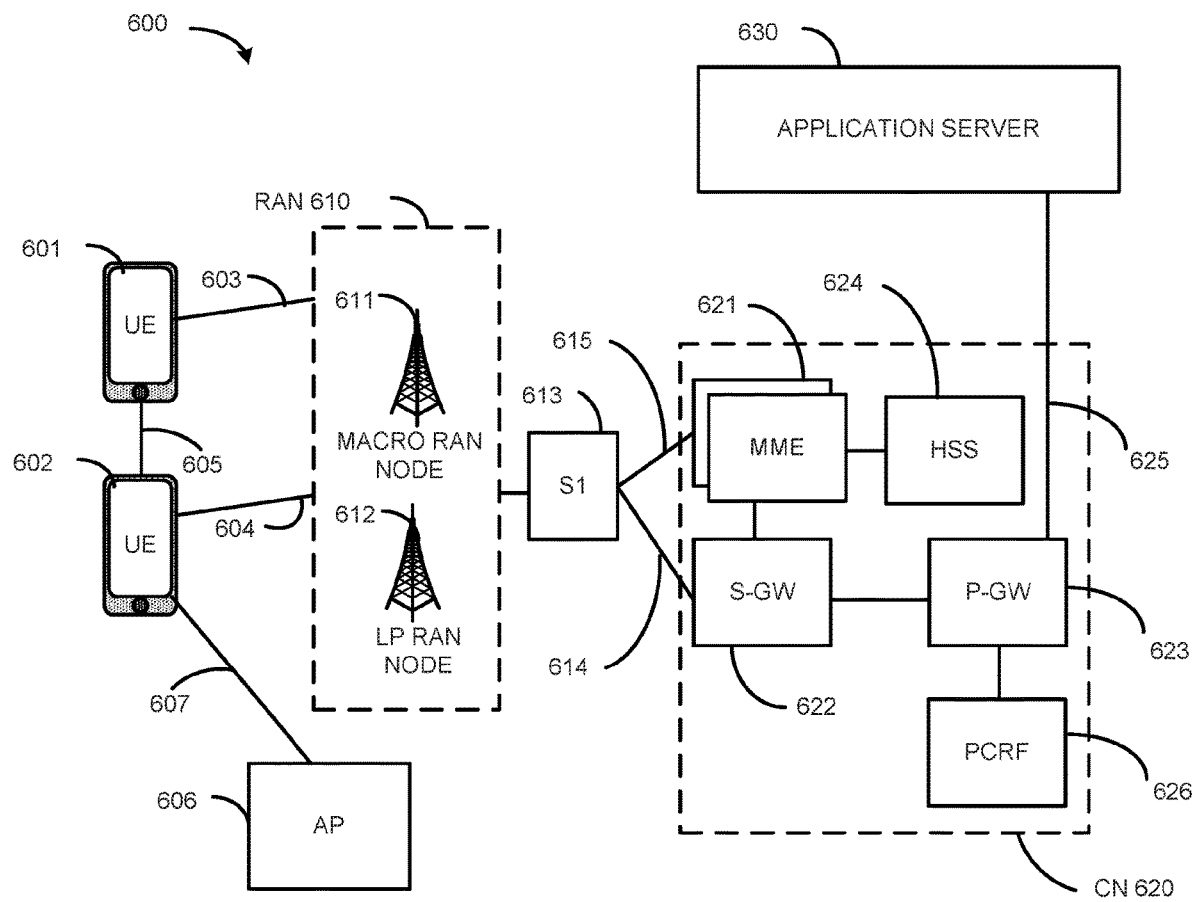
FIG. 6 illustrates a network architecture in accordance with some embodiments.

FIG. 6 illustrates an architecture of a system 600 of a network in accordance with some embodiments. The system 600 is shown to include a user equipment (UE) 601 and a UE 602. The UEs 601 and 602 may correspond to, and be substantially interchangeable with, UE 120. The UEs 601 and 602 are illustrated as smartphones (for example, handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 601 and 602 may be configured to connect, for example, communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP LTE protocol, a 5G protocol, a New Radio (NR) protocol, and the like. In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (for example, terrestrial access points) or satellite stations providing coverage within a geographic area (for example, a cell). The RAN 610 may include one or more RAN nodes for providing macrocells, for example, macro RAN node 611, and one or more RAN nodes for providing femtocells or picocells (for example, cells having smaller coverage areas, smaller user capacity, or higher bandwidth compared to macrocells), for example, low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance with various communication techniques, such as, but not limited to, an Orthogonal Frequency-Division Multiple Access (OFDMA) communication technique (for example, for downlink communications) or a Single Carrier Frequency Division Multiple Access (SC-FDMA) communication technique (for example, for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (for example, assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620 via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network and external networks such as a network including the application server 630 (alternatively referred to as application function (AF)) via an Internet Protocol (IP) interface 625. Generally, the application server 630 may be an element offering applications that use IP bearer resources with the core network (for example, UMTS Packet Services (PS) domain, LTE PS data services, etc.). In various embodiments, the application server 630 may correspond to the PSS/MEC server 116, the OTT streaming server 108, or the content source 136. The application server 630 may or may not be a DANE. In embodiments in which the application server 630 is a MEC server, it may be placed between the RAN 610 and the CN 620 to provide a MEC-based architecture.

In this embodiment, the P-GW 623 is shown to be communicatively coupled to an application server 630 via an IP communications interface 625. The application server 630 can also be configured to support one or more communication services (for example, Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
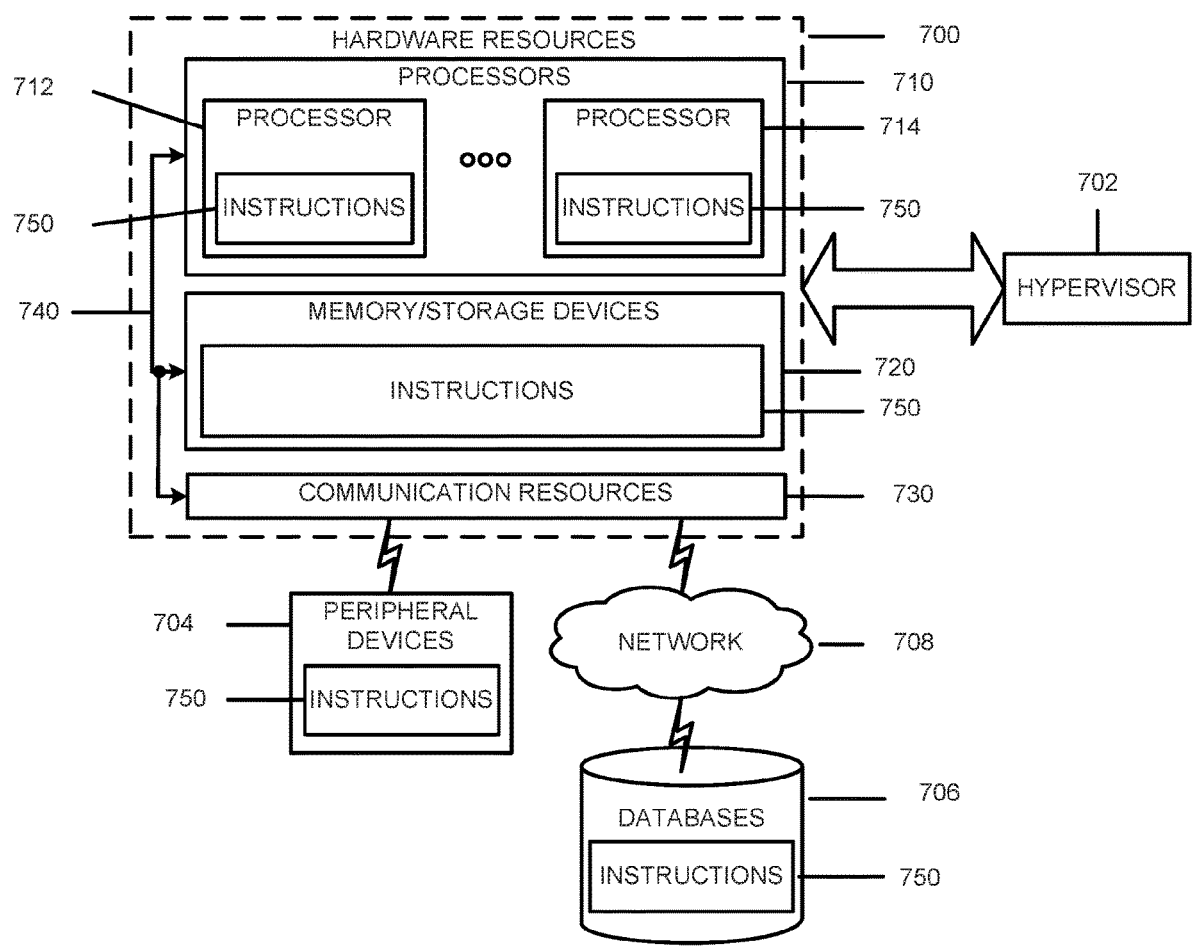
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization ("NFV")) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 7630 may include wired communication components (for example, for coupling via a Universal Serial Bus (USB)), cellular communication components, near field communication ("NFC") components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein.

In embodiments in which the hardware resources 700 are incorporated into a UE, for example, UE 120, UE 601, or UE 602, the instructions 750 may cause the processors 710 to perform the operation flow/algorithmic structure 400 or other operations of a UE described, for example, in the message exchange of FIG. 2. In some embodiments, the instructions 750 may cause the processors 710 to implement OTT streaming client 124 or the SAND entity 128 to provide the described operations.

In embodiments in which the hardware resources 700 are incorporated into a PSS/MEC server, for example, PSS/MEC server 116 or application server 630, the instructions 750 may cause the processors 710 to perform the operation flow/algorithmic structure 400 or other operations of a PSS/MEC server described, for example, in the message exchange of FIG. 2. In some embodiments, the instructions 750 may cause the processors 710 to implement the SAND entity 140 to provide the described operations.

The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting examples are provided below.

Example 1 may include or more computer-readable media having instructions that, when executed, cause a server to: set up a first leg of a transmission control protocol ("TCP") connection between the server and a streaming client of a user equipment; set up a second leg of the TCP connection between the server and a hypertext transfer protocol over transport layer security (HTTPS) server; detect, in a ClientHello message transmitted from the streaming client to the HTTPS server, a transport layer security ("TLS") extension that corresponds to a first server- and network-assisted dynamic adaptive streaming over hypertext transport protocol ("SAND") message; and modify a media presentation description ("MPD") file based on the SAND message and cause the MPD file to be transmitted to a user equipment.

Example 2 may include the one or more computer-readable media of example 1 or some other example, wherein the SAND message is a first SAND message and the instructions, when executed, further cause the server to: insert, in a ServerHello message transmitted from the HTTPS server, a second SAND message.

Example 3 may include the one or more computer-readable media of example 2 or some other example, wherein the first SAND message includes a status message or a metrics message and the second SAND message includes a parameters enhancing reception message.

Example 4 may include the one or more computer-readable media of example 1 or some other example, wherein the SAND message includes a user equipment authentication/authorization identifier ("UEAA ID") and a service identifier ("ID") and the instructions, when executed, further cause the server to: authenticate or authorize a user equipment ("UE") or over-the-top ("OTT") streaming service based on the UEAA ID and the service ID; and engage a SAND entity in a message exchange based on the authentication or authorization of the UE or OTT streaming service.

Example 5 may include the one or more computer-readable media of example 1 or some other example, wherein the instructions, when executed, further cause the server to: extract the SAND message from the ClientHello message based on detection of the TLS extension.

Example 6 may include the one or more computer-readable media of any one of examples 1-5 or some other example, wherein the server is a packet-switched streaming service ("PSS") server.

Example 7 may include the one or more computer-readable media of any one of examples 1-5 or some other example, wherein the server is a mobile edge computing server.

Example 8 may include a user equipment ("UE") having circuitry to provide an over-the-top ("OTT") streaming client to: establish a transmission control protocol ("TCP") connection; generate a message to establish a secured data path to a hypertext transfer protocol over transport layer security (HTTPS) server, the message to include a transport layer security ("TLS") extension that corresponds to a server- and network-assisted dynamic adaptive streaming over hypertext transport protocol ("SAND") message; and cause the message to be transmitted to the HTTPS server.

Example 9 may include the UE of example 8 or some other example, wherein the message is a TLS handshaking message.

Example 10 may include the UE of example 9 or some other example, wherein the TLS handshaking message is a ClientHello message.

Example 11 may include the UE of example 10 or some other example, wherein the SAND message is a first SAND message and the OTT streaming client is further to: receive a ServerHello message from a server; and extract a second SAND message from the ServerHello message.

Example 12 may include the UE of example 11 or some other example, wherein the OTT streaming client is further to stream video over a TLS connection based on information from the second SAND message.

Example 13 may include the UE of example 10 or some other example, wherein the SAND message is to include a user equipment authentication/authorization identifier ("UEAA ID") to identify a specific streaming service in the UE.

Example 14 may include the UE of example 10 or some other example, wherein the SAND message is to include a service identifier to identify a service registered by a mobile network operator.

Example 15 may include the UE of any one of examples 8-14 or some other example, wherein the OTT streaming client is further to: receive a media presentation description ("MPD") file; and request media segments based on the MPD file.

Example 16 may include a transport layer security ("TLS") handshaking message having: a version field with a value to identify one or more secure socket layer ("SSL")/TLS protocol versions; a random value field with a random structure; a cipher suites field with a value to identify an SSL cipher; a TLS extension field with a value to identify a SAND message; and a SAND message field to include information to be conveyed by the SAND message.

Example 17 may include the TLS handshaking message of example 16 or some other example, wherein the TLS handshaking message comprises a ClientHello message.

Example 18 may include the TLS handshaking message of example 17 or some other example, wherein the cipher suites field includes one or more values to identify one or more SSL ciphers supported by an over-the-top ("OTT") streaming client.

Example 19 may include the TLS handshaking message of example 18 or some other example, wherein the random structure is based on a timestamp of the OTT streaming client.

Example 20 may include the TLS handshaking message of example 17 or some other example, wherein the SAND message is a status message for a metrics message.

Example 21 may include the TLS handshaking message of example 16 or some other example, wherein the TLS handshaking message comprises a ServerHello message.

Example 22 may include the TLS handshaking message of example 21 or some other example, wherein the cipher suites field includes a single value to identify a single SSL cipher selected from a list of SSL ciphers supported by an over-the-top ("OTT") streaming client.

Example 23 may include the TLS handshaking message of example 21 or some other example, wherein the random structure is based on a timestamp of a server.

Example 24 may include the TLS handshaking message of example 21 or some other example, wherein the SAND message is a parameters enhancing reception message.

Example 25 may include a method comprising: setting up a first leg of a transmission control protocol ("TCP") connection between the server and a streaming client of a user equipment; setting up a second leg of the TCP connection between the server and an hypertext transfer protocol over transport layer security (HTTPS) server; detecting, in a ClientHello message transmitted from the streaming client to the HTTPS server, a transport layer security ("TLS") extension that corresponds to a first server- and network-assisted dynamic adaptive streaming over hypertext transport protocol ("SAND") message; and modifying a media presentation description ("MPD") file based on the SAND message and cause the MPD file to be transmitted to a user equipment.

Example 26 may include the method of example 25 or some other example, further comprising inserting, in a ServerHello message transmitted from the HTTPS server, a second SAND message.

Example 27 may include the method of example 26 or some other example, wherein the first SAND message includes a status message or a metrics message and the second SAND message includes a parameters enhancing reception message Example 28 may include the method of any one of examples 25-27 or some other example, wherein the SAND message includes a user equipment authentication/authorization identifier ("UEAA ID") and a service identifier ("ID") and the method further comprises: authenticating or authorizing a user equipment ("UE") or over-the-top ("OTT") streaming service based on the UEAA ID and the service ID; and engaging a SAND entity in a message exchange based on the authentication or authorization of the UE or OTT streaming service.

Example 29 may include the method of any one of examples 25-28 or some other example, further comprising: extracting the SAND message from the ClientHello message based on detection of the TLS extension.

Example 30 may include the method of any one of examples 25-29 or some other example, wherein the server is a packet-switched streaming service ("PSS") server.

Example 31 may include the method of any one of examples 25-29 or some other example, wherein the server is a mobile edge computing server.

Example 32 may include a method comprising: establishing a transmission control protocol ("TCP") connection; generating a message to establish a secured data path to a hypertext transfer protocol over transport layer security (HTTPS) server, the message to include a transport layer security ("TLS") extension that corresponds to a server- and network-assisted dynamic adaptive streaming over hypertext transport protocol ("SAND") message; and causing the message to be transmitted to the HTTPS server.

Example 33 may include the method of example 32 or some other example, wherein the message is a TLS handshaking message.

Example 34 may include the method of example 33 or some other example, wherein the TLS handshaking message is a ClientHello message.

Example 35 may include the method of example 34 or some other example, wherein the SAND message is a first SAND message and the method further comprises: receiving a ServerHello message from a server; and extracting a second SAND message from the ServerHello message.

Example 36 may include the method of example 35 or some other example, further comprising streaming video over a TLS connection based on information from the second SAND message.

Example 37 may include the method of example 34 or some other example, wherein the SAND message is to include a user equipment authentication/authorization identifier ("UEAA ID") to identify a specific streaming service in the UE.

Example 38 may include the method of example 34 or some other example, wherein the SAND message is to include a service identifier to identify a service registered by a mobile network operator.

Example 39 may include the method of any one of examples 32-38 or some other example, further comprising: receiving a media presentation description ("MPD") file; and requesting media segments based on the MPD file.

Example 40 may include a method comprising: generating a transport layer security ("TLS") handshaking message having: a version field with a value to identify one or more secure socket layer ("SSL")/TLS protocol versions; a random value field with a random structure; a cipher suites field with a value to identify an SSL cipher; a TLS extension field with a value to identify a SAND message; and a SAND message field to include information to be conveyed by the SAND message; and transmitting the TLS handshaking message.

Example 41 may include the method of example 40 or some other example, wherein the TLS handshaking message comprises a ClientHello message.

Example 42 may include the method of example 41 or some other example, wherein the cipher suites field includes one or more values to identify one or more SSL ciphers supported by an over-the-top ("OTT") streaming client.

Example 43 may include the method of example 41 or 42 or some other example, wherein the random structure is based on a timestamp of the OTT streaming client.

Example 44 may include the method of any one of examples 41-43 or some other example, wherein the SAND message is a status message for a metrics message.

Example 45 may include the method of example 40 or some other example, wherein the TLS handshaking message comprises a ServerHello message.

Example 46 may include the method of example 45 or some other example, wherein the cipher suites field includes a single value to identify a single SSL cipher selected from a list of SSL ciphers supported by an over-the-top ("OTT") streaming client.

Example 47 may include the method of example 45 or 46 or some other example, wherein the random structure is based on a timestamp of a server.

Example 48 may include the method of any one of examples 45-47 or some other example, wherein the SAND message is a parameters enhancing reception message.

Example 49 may include the method of any one of examples 45-48 or some other example, wherein the TLS handshaking message is a first TLS handshaking message and generating the first TLS handshaking message comprises: receiving a second TLS handshaking message; and inserting the TLS extension and the SAND message into the second TLS handshaking message.

Example 50 may include an apparatus to perform any one of the methods of examples 25-49 or some other example.

Example 51 may include an apparatus comprising means to perform any one of the methods of examples 25-49 or some other example.

Example 52 may include one or more computer-readable media having instructions that, when executed, cause a device to perform any one of the methods of examples 25-49 or some other example.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed, cause a server to:
    set up a first leg of a transmission control protocol ("TCP") connection between the server and a streaming client of a user equipment;
    set up a second leg of the TCP connection between the server and a hypertext transfer protocol over transport layer security (HTTPS) server;
    detect, in a ClientHello message transmitted from the streaming client to the HTTPS server, a transport layer security ("TLS") extension that indicates presence of a server- and network-assisted dynamic adaptive streaming over hypertext transport protocol ("SAND") message field in the ClientHello message;
    in response to detecting the TLS extension, determining contents of the SAND message field in the ClientHello message; and
    modify a media presentation description ("MPD") file based on the contents of the SAND message field determined from the ClientHello message and cause the MPD file to be transmitted to the user equipment.

2. The one or more non-transitory, computer-readable media of claim 1, wherein the SAND message field is a first SAND message field and the instructions, when executed, further cause the server to:
    forward the ClientHello message to the HTTPS server;
    receive, from the HTTPS server, a ServerHello message in response to forwarding the ClientHello message to the HTTPS server;
    modify the ServerHello message by inserting, in the ServerHello message, a second SAND message field that includes information responsive to the first SAND message field in the ClientHello message; and forward the modified ServerHello message to the user equipment.

3. The one or more non-transitory, computer-readable media of claim 2, wherein the first SAND message field includes a status message or a metrics message and the second SAND message field includes a parameters enhancing reception message.

4. The one or more non-transitory, computer-readable media of claim 1, wherein the SAND message includes a user equipment authentication/authorization identifier ("UEAA ID") and a service identifier ("ID") and the instructions, when executed, further cause the server to:
authenticate or authorize the user equipment ("UE") or over-the-top ("OTT") streaming service based on the UEAA ID and the service ID; and
engage a SAND entity in a message exchange based on the authentication or authorization of the UE or OTT streaming service.

5. The one or more non-transitory, computer-readable media of claim 1, wherein the instructions, when executed, further cause the server to:
extract the SAND message field from the ClientHello message based on detection of the TLS extension.

6. The one or more non-transitory, computer-readable media of claim 1, wherein the server is a packet-switched streaming service ("PSS") server.

7. The one or more non-transitory, computer-readable media of claim 1, wherein the server is a mobile edge computing server.

8. The one or more non-transitory, computer-readable media of claim 1, wherein the SAND message field includes a service identifier to identify a service registered by a mobile network operator.

9. The one or more non-transitory, computer-readable media of claim 2, wherein the user equipment is to stream video over a TLS connection based on information included in the contents of the second SAND message field.

10. A user equipment ("UE") comprising:
processing circuitry to implement an over-the-top ("OTT") streaming client that is configured to:
establish a transmission control protocol ("TCP") connection with a hypertext transfer protocol over transport layer security (HTTPS) server;
generate a ClientHello message to establish a secured data path to the HTTPS server, the message including a transport layer security ("TLS") extension that indicates presence of a server- and network-assisted dynamic adaptive streaming over hypertext transport protocol ("SAND") message field in the ClientHello message;
cause the ClientHello message to be transmitted to the HTTPS server;
receive a ServerHello message from the HTTPS server in response to transmitting the ClientHello message to the HTTPS server;
detect, in the ServerHello message, a TLS extension indicating presence of a second SAND message field in the ServerHello message; and
upon detecting the TLS extension in the ServerHello message, determining contents of the second SAND message field in the ServerHello message.

11. The UE of claim 10, wherein the message is a TLS handshaking message.

12. The UE of claim 10, wherein the OTT streaming client is further to stream video over a TLS connection based on information included in the contents of the second SAND message field.

13. The UE of claim 10, wherein the SAND message is to include a user equipment authentication/authorization identifier ("UEAA ID") to identify a specific streaming service in the UE.

14. The UE of claim 10, wherein the SAND message field is to include a service identifier to identify a service registered by a mobile network operator.

15. The UE of claim 10, wherein the OTT streaming client is further configured to:
receive a media presentation description ("MPD") file; and
request media segments based on the MPD file.

16. One or more non-transitory, computer-readable media having instructions that, when executed, cause a device to:
establish a transmission control protocol ("TCP") connection with a hypertext transfer protocol over transport layer security (HTTPS) server;
generate a ClientHello message to establish a secured data path to the HTTPS server, the message including a transport layer security ("TLS") extension that indicates presence of a server- and network-assisted dynamic adaptive streaming over hypertext transport protocol ("SAND") message field in the ClientHello message;
cause the ClientHello message to be transmitted to the HTTPS server;
receive a ServerHello message from the HTTPS server in response to transmitting the ClientHello message to the HTTPS server;
detect, in the ServerHello message, a TLS extension indicating presence of a second SAND message field in the ServerHello message; and
upon detecting the TLS extension in the ServerHello message, determining contents of the second SAND message field in the ServerHello message.

17. The one or more non-transitory, computer-readable media of claim 16, wherein the message is a TLS handshaking message.

18. The one or more non-transitory, computer-readable media of claim 16, wherein the instructions, when executed, further cause the device to stream video over a TLS connection based on information included in the contents of the second SAND message field.

19. The one or more non-transitory, computer-readable media of claim 16, wherein the SAND message field is to include a user equipment authentication/authorization identifier ("UEAA ID") to identify a specific streaming service in the UE.

20. The one or more non-transitory, computer-readable media of claim 16, wherein the SAND message field is to include a service identifier to identify a service registered by a mobile network operator.

21. The one or more non-transitory, computer-readable media of claim 16, wherein the instructions, when executed, further cause the device to:
receive a media presentation description ("MPD") file; and
request media segments based on the MPD file.

* * * * *